No. 665,262. Patented Jan. 1, 1901.
S. B. PECK.
SCREW CONVEYER.
(Application filed Oct. 2, 1899.)
(No Model.)
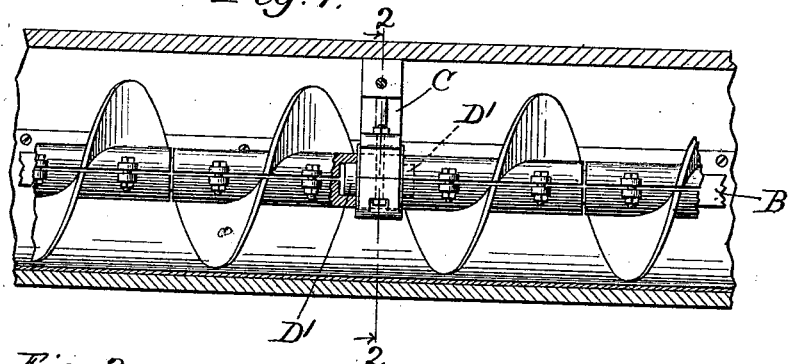
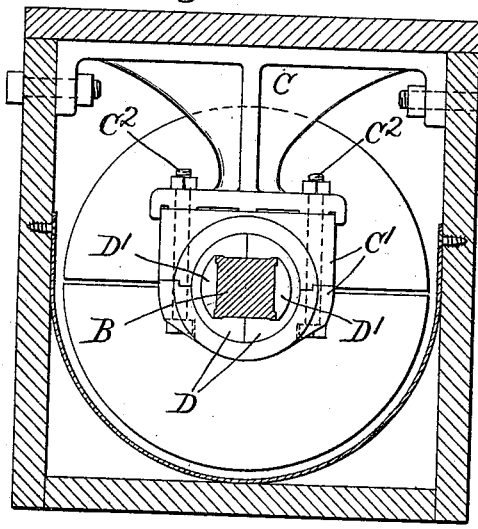
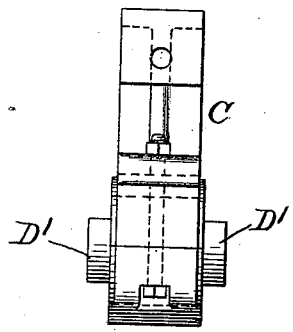
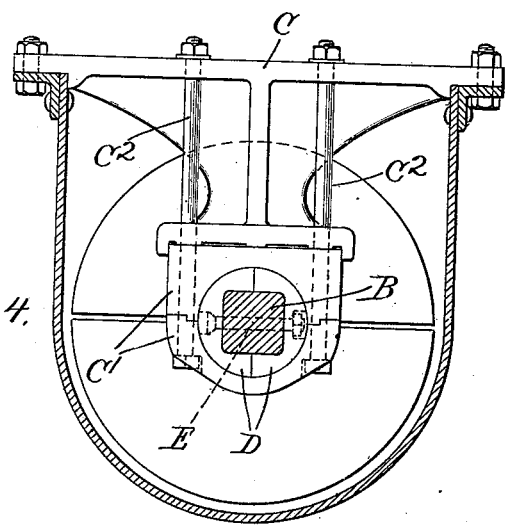
Witnesses.
Edward T. Wray.
Donald M. Carter.
Inventor.
Staunton B. Peck

UNITED STATES PATENT OFFICE.

STAUNTON B. PECK, OF CHICAGO, ILLINOIS, ASSIGNOR TO THE LINK-BELT MACHINERY COMPANY, OF SAME PLACE.

SCREW CONVEYER.

SPECIFICATION forming part of Letters Patent No. 665,262, dated January 1, 1901.

Application filed October 2, 1899. Serial No. 732,308. (No model.)

*To all whom it may concern:*

Be it known that I, STAUNTON B. PECK, a citizen of the United States, residing at Chicago, in the county of Cook and State of Illinois, have invented a certain new and useful Improvement in Screw Conveyers, of which the following is a specification.

My invention relates to screw conveyers, and has for its object to provide a new and improved screw conveyer and means of mounting the same.

My invention is illustrated in the accompanying drawings, wherein—

Figure 1 is a view of a screw conveyer, showing the application of my invention. Fig. 2 is a section on line 2 2, Fig. 1, the parts being enlarged. Fig. 3 is a side view of the hanger shown in Fig. 2. Fig. 4 is a view showing a modified construction.

Like letters refer to like parts throughout the several figures.

In the use of screw conveyers the material acted upon is carried along the conveyer from one end to the other, the conveyer-shaft usually being immersed in this material. When a screw conveyer is used in connection with coarse gritty material—such as ore, ashes, or the like—this material is constantly in contact with the bearings by means of which the conveyer-shaft is supported, as from the nature of things these bearings are submerged in this material. When an ordinary bearing is provided, this gritty material gets between the bearing-surfaces and in addition to rapidly destroying the bushings of the bearing destroys the shaft itself and in a short time weakens it, so that it will not stand the necessary torsional strain. It then becomes necessary to dismantle the entire conveyer and send it to the shop for repairs. This means great inconvenience, delay, and expense. One of the objects of my present invention is to prevent these evils.

My invention is applicable to any description of screw conveyer.

Referring now to Fig. 1, I have shown one form of conveyer made up of a series of conveyer-sections A, clamped upon a shaft B, so that they can be removed therefrom. This shaft may of course be of any desired length, depending upon the conditions to be met, and must be supported by intermediate bearings. In order to prevent the destruction of the shaft on account of these bearings, I construct them in a peculiar manner, so that neither of the bearing-surfaces will be on the shaft.

Referring now to Fig. 2, which shows one form of the bearing, I provide the hanger C with the journal-box C', made up of two parts, as shown, and fastened to the hanger by means of the bolts C². This journal-box is preferably made of some very hard material. Inside of said journal-box I provide a collar or part D, which surrounds the shaft and which is attached to it, so as to rotate therewith. This part or collar is made of some hard material—as, for example, chilled iron—and is removably connected to the shaft. As herein shown, this collar is split so that it may be easily attached to and removed from the shaft. The collar or part D may be attached to the shaft or may be held in place in any desired manner. When the form of conveyer shown in Fig. 1 is used, made of independent separable flights or sections, this collar may be held in place by providing it with the projections D' D' on each side. (See Fig. 3.) The sections of the conveyer at the point where the bearing is located are slightly separated, as shown, to provide space for the parts, and the sections nearest the bearing are cut away, so as to receive the projections D', and thus hold the collar in place. When the shaft is square, as shown in Fig. 2, the parts of the collar fit the shaft, and hence will rotate with it without any fastening devices. If the shaft is circular, it will be necessary to fasten the collar to the shaft by means of a bolt or other fastening device. If the conveyer is of the ordinary form, wherein the flights are attached directly to the shaft, it is necessary to connect the collar D directly with the shaft. I have shown such a construction in Fig. 4, wherein the bolt E passes through the collar and the shaft, as shown, said collar provided with countersunk holes for the head of the nut, so that they will not interfere with the bearing-face. In this construction I have shown the bolts C² as extending up to the top of the hanger. It is often inconvenient to get at said bolts when they are formed as shown in Fig. 2, but this difficulty is entirely obviated when they run to the top of the hanger. When the shaft is square, the bolt E does not receive any of the strain, but simply holds the parts in place, and of course may be small. It is of course evident that the bearing may be supported in any desired manner instead of using the hanger C. When said hangers are used, they may be supported in any desired manner— as, for example, by resting upon the top of the box in which the conveyer-screw works. When the construction herein shown is used, it will be seen that the bearing-surfaces consist of two chilled hard surfaces, which will stand a great deal of wear, and it will further be seen that when the bearing becomes injured or destroyed the collar and journal-box can be easily and quickly removed and others substituted without in any manner disturbing the conveyer itself.

I claim—

In a screw conveying device, the combination of a containing-box normally in a horizontal position for the conveyance of gritty substances, a shaft in said containing-box, a screw-blade upon and about said shaft, a longitudinally-split cylindrical-like enlargement removably, but normally rigidly, attached to and surrounding the shaft so as to rotate therewith, a longitudinally-split tube-like bearing part into which said cylindrical part fits, a support removably attached to the top of said containing-box and connected with the tube-like bearing part so as to hold the same in position, the outer face of the cylindrical part snugly fitting the inner face of the tubular part substantially throughout their lengths, so as to present extended bearing-surfaces and to prevent the gritty material in which the bearing is embedded from entering between these parts, substantially as described.

STAUNTON B. PECK.

Witnesses:
DONALD M. CARTER,
HOMER L. KRAFT.